May 15, 1934.   J. W. LEIGHTON   1,958,968
VEHICLE SUSPENSION BEARING SUPPORT

Filed Sept. 13, 1933

Inventor.
John Wycliffe Leighton.

Patented May 15, 1934

1,958,968

UNITED STATES PATENT OFFICE 1,958,968

VEHICLE SUSPENSION BEARING SUPPORT

John Wycliffe Leighton, Port Huron, Mich.

Application September 13, 1933, Serial No. 689,283

4 Claims. (Cl. 267—54)

The principal objects of this invention are to simplify the assembly of threaded bearing spring end supports and to provide a form of bearing which will enable the making of adjustments in the spacing of the spring end between the spaced arms of the frame bracket.

The principal feature of the invention consists in the novel arrangement of the threaded bearing bushing mounted on a threaded spindle whereby an endwise travel of the bushing on the spindle may be effected for obtaining an adjustment of the bushing-carrying spring end in relation to the arms of the supporting bracket or shackle.

In the accompanying drawing, Figure 1 is a side elevational view of a frame bracket and spring end constructed in accordance with this invention.

Figure 1:
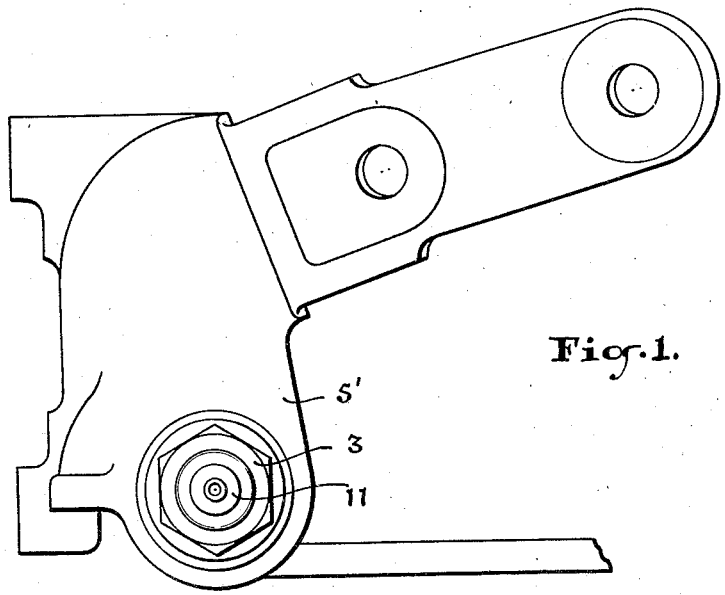
Figure 2:
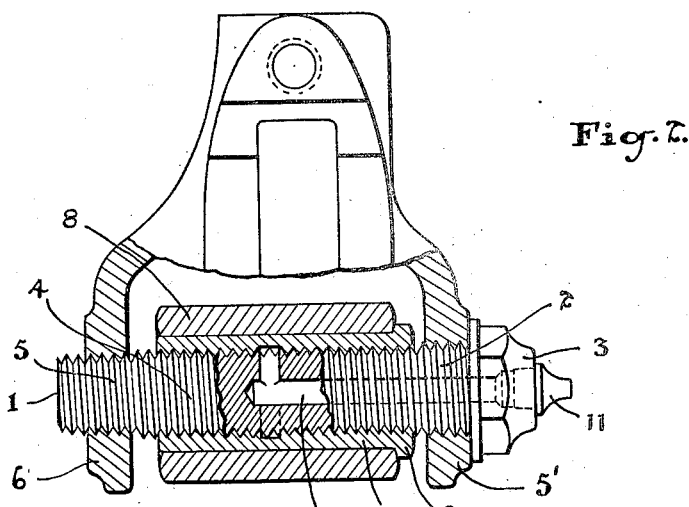
Figure 2 is an elevational sectional view taken through the centre of the spring end bearing.

In the development of threaded bearing supports for the spring end suspension of vehicles, considerable variation in design and construction of both the bracket, the threaded spindle and the bearing bushing has been proposed. In such assemblies different practices are followed in the matter of ensuring the placing of the spring end centrally between the shackle arms or spaced arms and the frame bracket.

It has been found desirable in certain automotive practice to provide some means for adjusting the spacing arrangement of the spring eye in relation to the side members of either the bracket or shackle structures and the present invention has been devised particularly for this purpose. The invention is extremely simple.

It is preferred that the threaded spindle or shackle bolt 1 be threaded with a portion 2 threaded adjacent to the bolt head 3 of a slightly larger outside diameter than the central portion 4 which forms the bearing, and the other end 5 is preferably formed of a slightly reduced diameter.

The enlarged threaded end 2 is adapted to jamb tightly in the threaded bracket arm 5', as also is the threaded end 5 adapted to jamb into the bracket arm 6. The entire thread is of course of the same pitch with the diameter at the ends slightly varying to accomplish the desired results.

A bushing 7 is threaded on to the central portion 4 of the bearing spindle, it having a threaded interior formed with a neat rotating bearing fit. The bushing is fitted snugly within the eye portion 8 of the spring end and is normally rigid therewith. The external surface of the bushing is cylindrical, and under excessive rotating effort will turn.

At one end the bushing 7 is provided with a flange 9 which is of a suitable nut formation, hexagonal or octagonal, and the inner face of this flange fits snugly against the end of the spring eye 8.

Under ordinary practise and circumstances the sleeve 7 is a tight non-rotating fit in the bushing eye, but a spanner may be applied to the nut end 9 of said bushing so that it may be turned.

Turning the bushing within the spring eye causes it to travel endwise on the threaded spindle 1 so that the spring eye will be moved in its relative position between the frame ends 5' and 6.

It will be readily understood that if the assembly of the shackles or spring bolts has been carelessly done and the springs require adjustment, it is merely necessary to turn the bushing 7 slightly to effect the proper setting of the spring in relation to the end bracket.

The threaded bearing supports between the bushing and the threaded bearing bolt are lubricated in the usual manner through the central channel 10 fed from the fitting 11 at one end.

Figure 3:
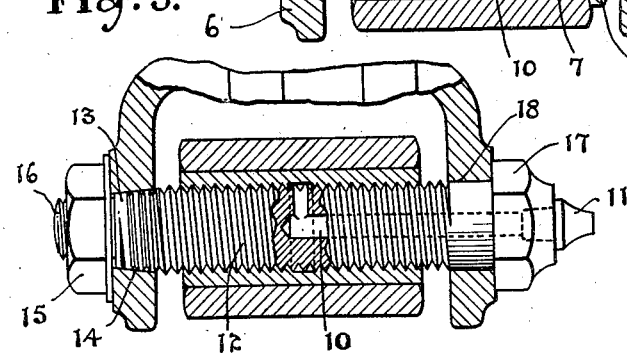
Figure 3 is a view similar to Figure 2 of a modified construction.

In the form of the invention shown in Figure 3 the threaded bearing bolt 12 is formed with a tapered portion 13 which extends into a tapered hole 14 in one of the bracket arms and it is rigidly held by the jamb nut 15 on the reduced threaded end 16. The end of the bolt adjacent to the head 17 turns freely in the circular hole 18 in the other bracket arm. When adjustment is desired the bolt is rotated to effect the endwise movement of the spring end and the jamb nut is then tightened to hold the bolt from turning.

What I claim as my invention is:—

1. In a vehicle suspension bearing support, the combination with a pair of spaced arms having a swingable member disposed therebetween and a threaded bearing spindle extending through said swingable member and supported at the ends in said spaced arms, of a bushing rotatably mounted adjustable in said swingable member and having a threaded interior bearing on said spindle, and means for effecting the rotation of said bushing in the bracket to adjust the position of said swingable member between said spaced arms.

2. In a vehicle suspension bearing support, the combination with a pair of spaced arms having a swingable member disposed therebetween and a threaded bearing spindle extending through said swingable member and supported at the ends in said spaced arms of a bushing threaded internally and supported on said spindle, said bushing being rotatably adjustable in said swingable member and having a flange at one end adapted to engage the end of the swingable member, said flange having a nut-shaped perimeter.

3. In a vehicle suspension bearing support, the combination with spaced arms adapted to receive a spring eye therebetween and a threaded bearing spindle extending through the spring eye and supported in said spaced arms, of a threaded bearing sleeve adjustably retained in said spring eye and engaging the spindle in threaded bearing contact.

4. In a vehicle suspension bearing support, the combination with spaced arms adapted to receive a spring eye therebetween and a threaded bearing spindle extending through the spring eye and supported in said spaced arms, of a threaded bearing sleeve adjustably retained in said spring eye and engaging the spindle in threaded bearing contact, said bearing sleeve having a rotatable non-threaded pressure engagement with the spring eye and having a portion thereof shaped to receive a turning wrench for the purpose of positioning the spring eye in clearance relation to said spaced arms.

JOHN WYCLIFFE LEIGHTON.